(12) United States Patent
Kojima et al.

(10) Patent No.: US 8,297,602 B2
(45) Date of Patent: Oct. 30, 2012

(54) VIBRATION ISOLATOR

(75) Inventors: Hiroshi Kojima, Yokohama (JP); Yoshitaka Otsubo, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 916 days.

(21) Appl. No.: 11/918,318

(22) PCT Filed: Apr. 10, 2006

(86) PCT No.: PCT/JP2006/307573
§ 371 (c)(1),
(2), (4) Date: Feb. 26, 2008

(87) PCT Pub. No.: WO2006/109773
PCT Pub. Date: Oct. 19, 2006

(65) Prior Publication Data
US 2009/0026671 A1    Jan. 29, 2009

(30) Foreign Application Priority Data
Apr. 12, 2005 (JP) ................................. 2005-114949

(51) Int. Cl.
*F16F 13/00* (2006.01)
(52) U.S. Cl. ................... 267/140.12; 267/219; 267/293
(58) Field of Classification Search ............. 267/140.11, 267/140.12, 140.13, 219, 293; 248/562, 248/636, 638
See application file for complete search history.

(56) References Cited

U.S. PATENT DOCUMENTS

| | | | | |
|---|---|---|---|---|
| 4,756,514 A | * | 7/1988 | Kanda ...................... | 267/140.12 |
| 4,861,004 A | * | 8/1989 | Yokota et al. ............ | 267/140.12 |
| 4,896,868 A | * | 1/1990 | Thelamon et al. ....... | 267/140.12 |
| 5,092,565 A | * | 3/1992 | Hamaekers et al. ..... | 267/140.12 |
| 5,299,788 A | * | 4/1994 | Kanda ...................... | 267/140.12 |
| 5,509,643 A | * | 4/1996 | Carstens et al. ......... | 267/140.12 |
| 5,595,373 A | * | 1/1997 | Ikeda ....................... | 267/140.12 |
| 5,690,320 A | * | 11/1997 | Kanda ...................... | 267/140.12 |
| 6,663,090 B2 | * | 12/2003 | Simuttis et al. .......... | 267/140.13 |

(Continued)

FOREIGN PATENT DOCUMENTS
EP    0 452 169 A1    10/1991
(Continued)

OTHER PUBLICATIONS

European Search Report issued in European Application No. 06731520.0-2424 dated Mar. 10, 2011 (6 pages).

*Primary Examiner* — Robert A Siconolfi
*Assistant Examiner* — Mariano Sy
(74) *Attorney, Agent, or Firm* — Sughrue Mion, PLLC

(57) ABSTRACT

A vibration isolator having a pair of pressure receiving fluid chambers between an outer cylinder and a mounting member, at two end sides along a main amplitude direction. A rubber elastic body changes the internal volumes of the pair of pressure receiving fluid chambers in directions opposite to each other, and fluid flows from the pressure receiving fluid chambers to an auxiliary fluid chamber through one of two orifices and flows from the auxiliary fluid chamber to the pressure receiving fluid chambers through the other orifice. Since a fluid pressure in the auxiliary fluid chamber is kept approximately constant, the fluid in the pair of pressure receiving fluid chambers smoothly flows, with a low resistance, into the auxiliary fluid chamber through the orifices. Therefore, any rise of the fluid pressure in the pressure receiving fluid chambers may be suppressed, such that rise of the dynamic spring constant may be suppressed.

8 Claims, 7 Drawing Sheets

U.S. PATENT DOCUMENTS

| | | | |
|---|---|---|---|
| 6,981,696 B2 * | 1/2006 | Hatano et al. | 267/140.12 |
| 7,314,213 B2 * | 1/2008 | Tanaka | 267/140.5 |
| 2002/0158389 A1 | 10/2002 | Yoshida et al. | |

FOREIGN PATENT DOCUMENTS

| | | | |
|---|---|---|---|
| GB | 2 298 019 A | 8/1996 |
| JP | 5-19697 U | 3/1993 |
| JP | 5-149374 A | 6/1993 |
| JP | 5-340442 A | 12/1993 |
| JP | 6-12852 U | 2/1994 |
| JP | 8-233022 A | 9/1996 |
| JP | 2000-120760 A | 4/2000 |

* cited by examiner

VIBRATION ISOLATOR

CROSS REFERENCE TO RELATED APPLICATIONS

This application is a National Stage of International Application No. PCT/JP2006/307573 filed on Apr. 10, 2006, claiming priority based on Japanese Patent Application No. 2005-114949, filed Apr. 12, 2005, the contents of all of which are incorporated herein by reference in their entirety.

TECHNICAL FIELD

The present invention relates to a fluid filled vibration isolator that is applicable to an engine mount or the like of an automobile or a general industrial machine, for absorbing vibrations from a vibration generation portion such as an engine or the like, and for preventing vibration transmission to a vibration receiving unit, such as a vehicle body or the like.

RELATED ART

For example, a vibration isolator is disposed, as an engine mount, between an engine which is a vibration generating portion of a vehicle and the vehicle body which is a vibration receiving portion, and such vibration isolator absorbs vibrations generated by the engine and suppress vibration transmission to the vehicle body side. Vibration isolators, such as those described in a document 1 and a document 2, respectively, are known for this type of vibration isolator.

The vibration isolator in the document 1 is configured as a so-called differential pressure type vibration isolator, and is provided with a rubber elastic body inside an outer cylinder, a pressure receiving fluid chamber with a portion of an internal wall formed by the rubber elastic body, and an auxiliary fluid chamber with a portion of an internal wall formed by a diaphragm, the pressure receiving fluid chamber and the auxiliary fluid chamber being mutually communicated by a restrict passage. In such a differential pressure type vibration isolator, when vibration is input, the rubber elastic body elastically deforms, and also, along with the elastic deformation of the rubber elastic body, the internal volume of the pressure receiving fluid chamber expands and contracts, thereby absorbing the inputted vibration by the viscous resistance and the like of liquid flowing in the restrict passage communicating the pressure receiving fluid chamber and the auxiliary fluid chamber.

The vibration isolator of the document 2 is configured as a so-called differential motion of pressure type vibration isolator, provided with: an outer cylinder, connected to one or other of a vibration generating portion or a vibration receiving unit; an internal cylinder, connected to the other of the vibration generating portion or the vibration receiving unit; a rubber elastic body, disposed between the outer cylinder and the inner cylinder and elastically deforming when vibration is generated: a pair of fluid chambers, having a portion of a partitioning wall formed by the rubber elastic body, and the pair being disposed at both ends with the inner cylinder in between, and respectively expanding and contracting when vibration is generated; and a restrict passage connecting together the pair of fluid chambers. In this differential motion of pressure type vibration isolator, when vibration is inputted, the internal volume of one of the fluid chambers contracts, and the internal volume of the other of the fluid chambers expands, causing fluid to flow in the restrict passage due to a fluid pressure difference generated between this pair of fluid chambers. When this occurs, the change in the internal volume of one of the fluid chambers is in the mutually opposite direction to that of the other of the fluid chambers (one expands while the other contracts), therefore the fluid pressure difference between the pair of fluid chambers may be made greater, in comparison to the fluid pressure difference between the pressure receiving fluid chamber and the auxiliary fluid chamber in a differential pressure vibration isolator, and the to-and-fro flow of fluid between the fluid chambers via the restrict passage may be promoted, and the damping of vibrations, obtained by the viscous resistance of the fluid and the like, may be increased effectively.

In the vibration isolators of the above described document 1 and the document 2, the passage length and cross-sectional area of the restrict passage is set (tuned) so as to correspond to a vibration of a particular frequency region (a shake vibration, for example), and when vibration is inputted in this particular frequency region, resonance phenomena occurs (liquid column resonance) in fluid that is passing to-and-fro in the restrict passage between the pair of pressure receiving fluid chambers, and inputted vibration may be effectively absorbed by this liquid column resonance.

Document 1: Japanese Patent Application Laid-Open (JP-A) No. 5-149374

Document 2: Japanese Patent Application Laid-Open (JP-A) No. 8-233022

DISCLOSURE OF THE INVENTION

Problem to be Solved by the Invention

However, in the above described differential pressure type vibration isolator, since fluid pressure change, in order to cause fluid to flow through the restrict passage between the pressure receiving fluid chamber and the auxiliary fluid chamber, is only generated in the pressure receiving fluid chamber, it is difficult to increase the amount of damping of vibrations that is obtained by fluid flowing in the restrict passage, when compared to a differential motion of pressure vibration isolator.

On the other hand, in the above described differential motion of pressure vibration isolator, when vibrations are input that are outside of the frequency region corresponding to the restrict passage (such as, for example, high frequency vibrations of booming noise and the like), the restrict passage becomes in a blocked state and fluid pressure within the fluid chamber is readily raised, when compared to in a differential pressure vibration isolator, and the dynamic spring constant rises along with the rise in the fluid pressure within the fluid chamber, leading to a worsening of the ability to absorb high frequency vibrations.

An object of the present invention is, considering the above conditions, to provide a vibration isolator capable of efficiently increasing damping against inputted vibration, obtained by a fluid flowing in a restrict passage and also effectively suppressing the rise in dynamic spring constant when vibration is inputted therein.

Means of Solving the Problem

In order to achieve the above objective, the vibration isolator according to claim 1 includes: an outer cylinder member that is formed in a substantially cylindrical shape, and is connected to one of a vibration generating portion or a vibration receiving portion; a mounting member that is disposed at an inner peripheral side of the outer cylinder member, and is connected to the other of the vibration generating portion or the vibration receiving portion; a rubber elastic body that is disposed between the outer cylinder member and the mounting member, and elastically connects the outer cylinder member and the mounting member; a pair of first pressure receiving fluid chambers, each of which is provided between the outer cylinder member and the mounting member, at least a portion of an internal wall of each first pressure receiving fluid chamber being formed of the elastic body, and the first pressure receiving fluid chambers being filled with fluid; an auxiliary fluid chamber that is filled with fluid, an internal volume of the auxiliary fluid chamber being able to expand or contract according to changes in fluid pressure; and a pair of first restrict passages that communicate respectively the pair of first pressure receiving fluid chambers with the auxiliary fluid chamber, wherein one of the first pressure receiving fluid chambers is disposed between the outer cylinder member and the mounting member at one end side in a radial direction with the mounting member being at the center, and the other of the first pressure receiving fluid chambers is disposed between the outer cylinder member and the mounting member at the other end side in the radial direction, and when the rubber elastic body elastically deforms due to vibration being inputted in a main amplitude direction, along which direction the pair of pressure receiving fluid chambers and the mounting member are arranged, in the radial direction, the rubber elastic body changes internal volumes of the pair of first pressure receiving fluid chambers in directions that are mutually opposite to each other, accompanying with elastically deforming in the main amplitude direction.

Explanation will now be given of the operation of the vibration isolator according to claim 1 of the present invention.

In the vibration isolator according to claim 1, one of the first pressure receiving fluid chambers is disposed at the one side along the main amplitude direction between the outer cylinder member and the mounting member, and also the other of the first pressure receiving fluid chamber is disposed at the other side along the radial direction between the outer cylinder member and the mounting member. Thereby, when vibration in the radial direction is inputted to the outer cylinder member or the mounting member, the internal volumes of the pair of first pressure receiving fluid chambers are respectively changed (expanded or contracted), and since the fluid pressures within the pair of first pressure receiving fluid chambers also change (increases or decreases), fluid flows to-and-fro through one of the restrict passages between one of the first pressure receiving fluid chambers and the auxiliary fluid chamber, and fluid flows to-and-fro through the other of the restrict passages between the other of the first pressure receiving fluid chambers and the auxiliary fluid chamber.

When this occurs, if the length and the cross-sectional area of the first restrict passages, that is to say, if the resistance to fluid flow, is set (tuned) to correspond to the vibration frequency inputted in along the main amplitude direction, then resonance occurs (liquid column resonance) in the fluid flowing to-and-fro through one of the first restrict passages between one of the first pressure receiving fluid chambers and the auxiliary fluid chamber, and resonance (liquid column resonance) also occurs in the fluid flowing to-and-fro through the other of the first restrict passages between the other of the first pressure receiving fluid chambers and the auxiliary fluid chamber, therefore inputted vibration along the main amplitude direction can be effectively absorbed by the liquid column resonance occurring in the pair of the restrict passages.

Furthermore, in the vibration isolator according to claim 1, when the rubber elastic body elastically deforms, due to the inputted vibration along the main amplitude direction of alignment of the pair of the pressure receiving fluid chambers and the mounting member, along with this elastic deformation in the main amplitude direction, the rubber elastic body changes the internal volume of each of the pair of first pressure receiving fluid chambers in directions that are mutually opposite to each other (expands one and contracts the other), and changes the fluid pressure within each of the pair of the pressure receiving fluid chambers in directions that are mutually opposite to each other (lowers one and raises the other). Thereby, while vibration is being inputted along the main amplitude direction, independent of the frequency of the inputted vibration, when fluid flows into the auxiliary fluid chamber from one of the pressure receiving fluid chambers through one of the restrict passages, fluid flows out from the auxiliary fluid chamber to the other of the pressure receiving fluid chambers through the other of the restrict passages. Therefore, even though the frequency of the inputted vibration is outside of the frequency regions corresponding to the restrict passages, the fluid pressure within the auxiliary fluid chamber is always maintained substantially constant, and an increase in the fluid pressure within the auxiliary fluid chamber can be made sufficiently small.

Therefore, in the vibration isolator according to claim 1, when vibration is being inputted along the main amplitude direction, even though the frequency of the inputted vibration is outside of the frequency region corresponding to the restrict passages, an increase in the flow resistance of fluid flowing through one of the restrict passages between one of the pressure receiving fluid chambers and the auxiliary fluid chamber and an increase in the flow resistance of fluid flowing through the other of the restrict passages between the other of the pressure receiving fluid chambers and the auxiliary fluid chamber, due to an increase in the fluid pressure within the auxiliary fluid chamber, can each be suppressed. Therefore, when one of the first pressure receiving fluid chambers contracts, there is a smooth flow, with low resistance, of liquid out from the first pressure receiving fluid chamber, through the restrict passage, to the inside of the auxiliary fluid chamber. As a result of this, a rise in the fluid pressure within the pressure receiving fluid chamber can be suppressed, and therefore a rise in the dynamic spring constant with respect to the inputted vibration can be suppressed.

Also, in a case in which the frequency of the inputted vibration is within the frequency region corresponding to the restrict passages, the change in the fluid pressure (fluid pressure rise) within the auxiliary fluid chamber becomes sufficiently small, and there is no impediment to fluid flow within the restrict passages by a rise in the fluid pressure within the auxiliary fluid chamber, and therefore fluid can flow smoothly, with low resistance, through the pair of restrict passages, between each of the pair of pressure receiving fluid chambers and the auxiliary fluid chamber, respectively. As a result of this, the damping effect, obtained due to fluid undertaking liquid column resonance within each of the pair of restrict passages, can be effectively increased.

Furthermore, the vibration isolator according to claim 2 of the present invention is the vibration isolator of claim 1, wherein the mounting member is disposed so as to pass through the internal peripheral side of the outer cylinder member.

The vibration isolator according claim 3 is the vibration isolator of claim 1 or claim 2, including: a second pressure receiving fluid chamber that is at the inner peripheral side of the outer cylinder member, and is provided between the rubber elastic body and a dividing member that is disposed at an axial direction outside of the rubber elastic body, the second pressure receiving fluid chamber being filled with fluid; and a second restrict passage that mutually communicates the second pressure receiving fluid chamber and the auxiliary fluid chamber.

The vibration isolator according to claim 4 is the vibration isolator of any one of claim 1 to claim 3, wherein, at the rubber elastic body, a pair of elastic partitioning wall portions that partition respectively the pair of first pressure receiving fluid chambers from external space are formed, and the cross-sectional shape in the radial direction of each elastic partitioning wall portion is shaped so as to protrude in a convex manner toward chamber inside of the first pressure receiving fluid chamber.

Effect of the Invention

As explained above, according to the vibration isolator of the present invention, damping against inputted vibration, provided by a fluid flowing in a restrict passage, can be effectively increased, and also any rise in dynamic spring constant when vibration is inputted can be effectively suppressed.

BEST MODE OF IMPLEMENTING THE INVENTION

Explanation will now be given of vibration isolators according to exemplary embodiments of the present invention, with reference to the drawings.

First Exemplary Embodiment

Figure 1:
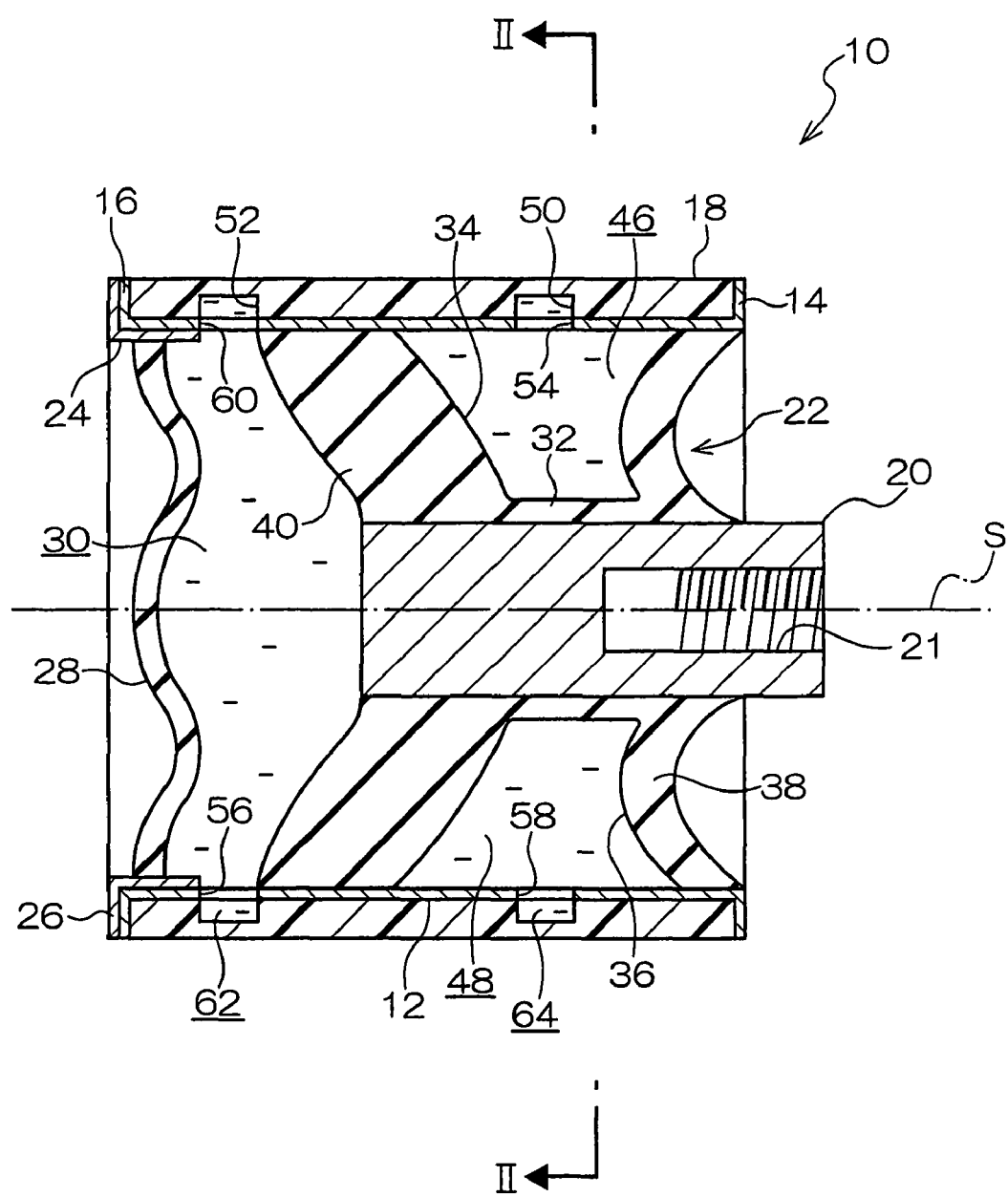
FIG. 1 is a side view cross-section showing a configuration of a vibration isolator of a first exemplary embodiment of the present exemplary embodiment.

FIG. 1 shows a vibration isolator according to a first exemplary embodiment of the present invention. This vibration isolator 10 is one that is used in an engine mount of a vehicle, supporting an engine, which is a vibration generating portion, on a vehicle body, which is a vibration receiving unit, in a manner that isolates vibrations. It should be noted that in the figures, the indicator S shows the axial center of the device, and explanation will be given below with "device axial direction" referring to the direction along this axial center S, and with "device radial direction" referring to a direction that is perpendicular to this axial center S.

As shown in FIG. 1, in the vibration isolator 10, there is provided a metal outer cylinder 12, which is formed into a thin-walled, substantially circular cylindrical shape that is open at both ends in the axial direction thereof, at the outer peripheral side, and at the internal peripheral side of this outer cylinder 12 is disposed a metal mounting member 20 that is formed into a substantially circular pillar shape. In the outer cylinder 12 there is a flange portion 14 and a flange portion 16, at one end portion and the other end portion in the axial direction thereof, respectively, formed bending around and extending toward the outer peripheral side.

In the vibration isolator 10, there is an orifice forming member 18 fitted over the outer peripheral side of the outer cylinder 12 and inserted between the flange portion 14 and the flange portion 16, the orifice forming member 18 being formed from a resin into a thick walled circular cylindrical shape. In the outer cylinder 12, after the orifice forming member 18 has been inserted and fitted over the outer peripheral side thereof, the flange portion 14 is formed at one end by bending around the outer cylinder 12 toward the outer peripheral side. By so doing, movement of the orifice forming member 18 in the axial direction is restrained by the pair of flange portions 14 and 16, and the orifice forming member 18 is fixed to the outer peripheral side of the outer cylinder 12. In the vibration isolator 10, there is also a bracket member (not shown in the drawings) provided fixed and connected to the outer peripheral side of the outer cylinder 12, via the orifice forming member 18, and it is attached to a vehicle body through this bracket member.

One end in the axial direction (the right side in FIG. 1) of the mounting member 20 protrudes out to the outside in the axial direction of the outer cylinder 12. There is a threaded hole 21 provided to open at one end face along the axial center S of the mounting member 20. A bolt (omitted in the drawings) is screwed into the threaded hole 21, and the mounting member 20 is attached to the engine side through this bolt.

A rubber elastic body 22 is disposed in the vibration isolator 10 between the outer cylinder 12 and the mounting member 20, the rubber elastic body 22 being formed overall into a substantially thick-walled circular cylindrical shape. The outer peripheral face of the rubber elastic body 22 is bonded to the inner peripheral face of the outer cylinder 12, and the inner peripheral face of the rubber elastic body 22 is bonded by vulcanization to the outer peripheral face of the mounting member 20. The outer cylinder 12 is thereby elastically attached to the mounting member 20 by the rubber elastic body 22.

In the vibration isolator 10, a thin-walled metal circular cylindrical shaped support fastening 24 is fitted into the internal peripheral side of the outer cylinder 12 at the other end thereof. This support fastening 24 has a flange portion 26 formed thereto by bending, the flange portion 26 protruding toward the outer peripheral side from an end portion at the outside in the axial direction of the support fastening 24, and the flange portion 26 abuts the flange portion 16 of the outer cylinder 12. The outer cylinder 12 has the rubber elastic body 22 bonded to the inner peripheral face thereof, and, after the support fastening 24 is fitted into the inner peripheral side, the outer cylinder 12 is crimped toward the inner peripheral side so as to shrink the diameter thereof. The rubber elastic body 22 is thereby compressed (pre-compressed) in the radial direction and also the support fastening 24 is fixed to the inside of the outer cylinder 12.

There is a thin membrane, circular plate-shaped diaphragm 28 disposed to the inner peripheral side of the support fastening 24, and the whole of the circumference of the outer peripheral portion of the diaphragm 28 is bonded by vulcanization to the inner peripheral face of the support fastening 24. A fluid chamber space is formed thereby between the diaphragm 28 and the rubber elastic body 22 at the inside of the outer cylinder 12, the fluid chamber being partitioned off from external portions, and a fluid, such as ethylene glycol, silicone oil or the like, is filled into the fluid chamber to form an auxiliary fluid chamber 30. Here, the diaphragm 28 curves in a wave-like form, in cross-section along a radial direction, so as to be in a slack state, thereby, the diaphragm 28 deforms with relatively small resistance in accordance with changes in the fluid pressure inside the auxiliary fluid chamber 30, and the internal volume of the auxiliary fluid chamber 30 is able to expand and contract.

As shown in FIG. 1, there is a circular cylindrical portion 32 formed at an intermediate portion in the axial direction of the rubber elastic body 22, and there is also a pair of hollow portions 34 and 36 at the outer peripheral side of the circular cylindrical portion 32, formed as concave shapes from the outer peripheral face toward the internal peripheral side. As is shown here in FIG. 2, the hollow portion 34 and the hollow portion 36 sandwich the mounting member 20 therebetween in a radial direction, and are provided respectively at one end and the other end of the rubber elastic body 22. The hollow portions 34 and 36 each form a substantially trapezoidal shape in cross-section along the axial direction, such that the width in the axial direction gets narrower on progression from the respective outer peripheral side to the respective internal peripheral side. Further, the inner peripheral face of the circular cylindrical portion 32 is bonded by vulcanization to an intermediate portion in the axial direction of the mounting member 20.

As shown in FIG. 1, there is a partitioning wall portion 38 formed in a substantially circular plate shape to one end in the axial direction of the rubber elastic body 22. The partitioning wall portion 38 is of substantially constant thickness in the axial direction at given positions on the radial direction thereof, and the inner peripheral face of the partitioning wall portion 38 is bonded by vulcanization to the outer peripheral surface at one end side of the mounting member 20 and the outer peripheral face of the partitioning wall portion 38 is bonded to the inner peripheral surface at one end side of the outer cylinder 12. The partitioning wall portion 38 is formed here into a curved shape in cross-section in the axial direction, protruding in a convex manner toward the inside of the hollow portions 34 and 36.

There is a partitioning wall portion 40 formed in a substantially circular thick-walled plate shape to the opposite end in the axial direction of the rubber elastic body 22 to the end of the partitioning wall portion 38, via the circular cylindrical portion 32. The partitioning wall portion 40 also has a substantially constant wall thickness, and the wall thickness thereof is thicker than the thickness of the partitioning wall portion 38. The inner peripheral face of the partitioning wall portion 40 is bonded by vulcanization to the outer peripheral face at the other end side of the mounting member 20, and also the outer peripheral face of the partitioning wall portion 40 is bonded to the inner peripheral face of the outer cylinder 12, at a position thereon that is near the support fastening 24.

Figure 2:
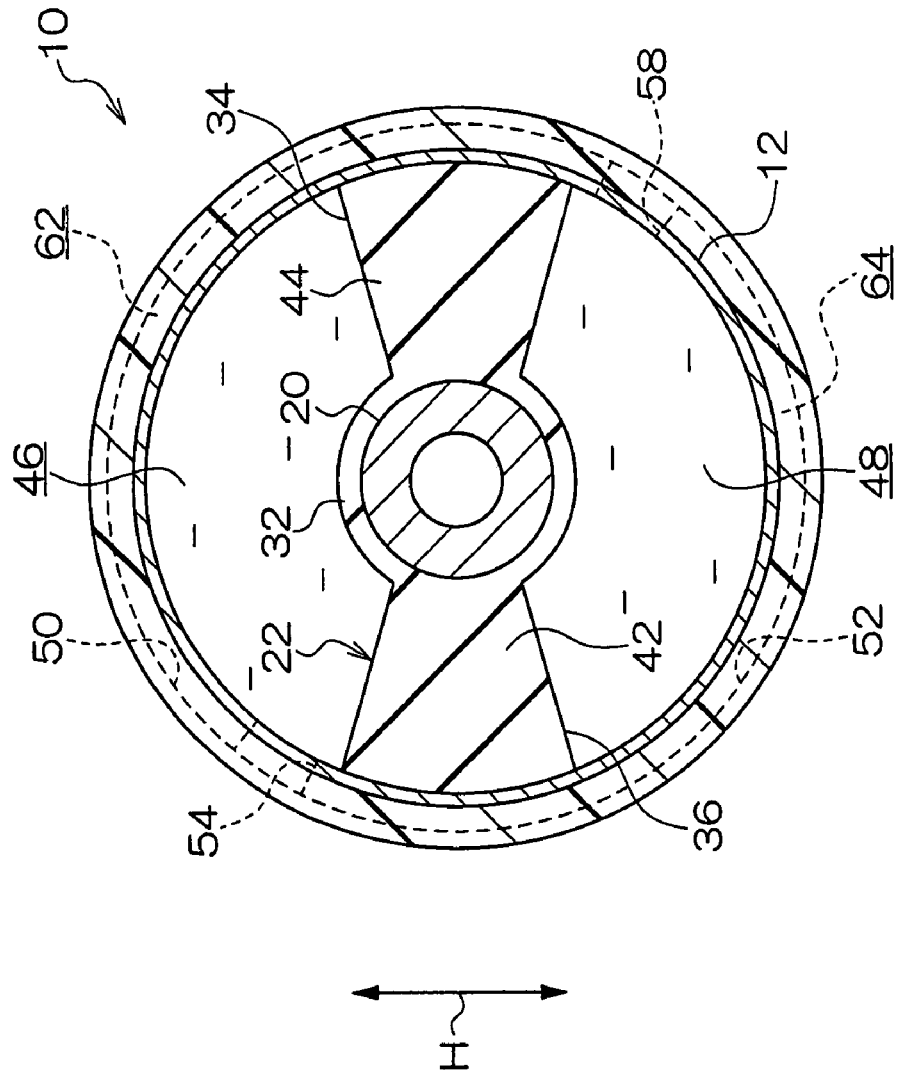
FIG. 2 is a cross-section taken along II-II of the vibration isolator shown in FIG. 1.

As shown in FIG. 2, in the rubber elastic body 22 there is a pair of dividing walls 42 and 44 formed integrally to, and extending out to the outer peripheral side along radial directions from, the circular cylindrical portion 32. These dividing walls 42 and 44 are each formed in a plate shape with a wall thickness in the circumferential direction that gradually gets thicker on progression from the internal peripheral side to the outer peripheral side, and the dividing walls 42 and 44 extend out in opposite directions to each other, with the circular cylindrical portion 32 at the center thereof. Outer peripheral edge portions of this pair of dividing walls 42 and 44 are each bonded to the inner peripheral face of the outer cylinder 12. The space that is formed between the partitioning wall portion 38 and the partitioning wall portion 40 in the rubber elastic body 22 is thereby divided up, by the dividing wall 42 and the dividing wall 44, into the hollow portion 34 and the hollow portion 36.

In the vibration isolator 10, the outer peripheral side of the hollow portions 34 and 36 is closed off by the inner peripheral face of the outer cylinder 12, and the internal portions of the hollow portions 34 and 36 each form a fluid space that is partitioned off from the outside. Each of this pair of fluid spaces is filed with the same liquid as that of the auxiliary fluid chamber 30, and forms a pair of pressure receiving fluid chambers 46 and 48.

Figure 3:
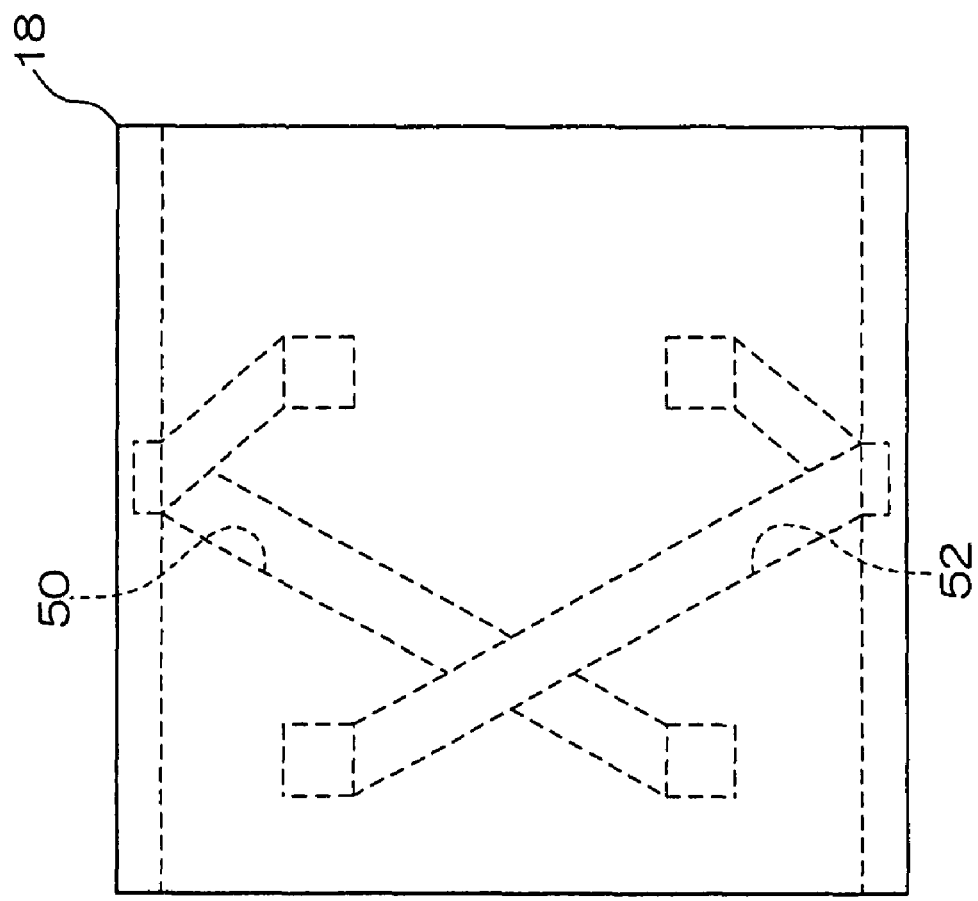
FIG. 3 is a side view showing a configuration of an orifice forming member in the vibration isolator shown in FIG. 1.

As shown in FIG. 3, there are two lengths of internal peripheral grooves 50 and 52 formed in the inner peripheral face of the orifice forming member 18, each of these being inclined to the circumferential direction, that is to say they are formed so as to extend in a spiral form. The internal peripheral grooves 50 and 52 each extend around approximately half of the circumference of the inner peripheral face of the orifice forming member 18. In the internal peripheral grooves 50 and 52, one end portions in the length direction thereof are positioned respectively at portions that are facing the pair of hollow portions 34 and 36 (pressure receiving fluid chambers 46 and 48) in the rubber elastic body 22, and other end portions that are positioned facing the auxiliary fluid chamber 30. It should be noted that the lengths (passage length) of the internal peripheral grooves 50 are adjustable by increasing or decreasing the number of turns thereof, respectively, around the inner peripheral face of the orifice forming member 18.

As shown in FIG. 1, there are cut out portions 54 and 56 formed to the outer cylinder 12 facing the respective one end and other end in the length direction of the one internal peripheral groove 50, and there are cut out portions 58 and 60 formed to the outer cylinder 12 facing the respective one end and other end in the length direction of the other internal peripheral groove 52. Thereby, the one end of the one internal peripheral groove 50 communicates through the cut out portion 54 to the pressure receiving fluid chamber 46, and the other end thereof communicates through the cut out portion 56 to the auxiliary fluid chamber 30. The one end of the other internal peripheral groove 52 communicates through the cut out portion 58 to the pressure receiving fluid chamber 46, and the other end thereof communicates through the cut out portion 60 to the auxiliary fluid chamber 30.

As shown in FIG. 1, the internal peripheral grooves 50 and 52 are each closed off on the inner peripheral side thereof by the outer peripheral face of the outer cylinder 12, therefore long narrow spaces that each extend in a spiral form are formed inside each of the internal peripheral grooves 50 and 52. The space formed within the internal peripheral groove 50 configures an orifice 62 that mutually communicates the one pressure receiving fluid chamber 46 and the auxiliary fluid chamber 30. Also, the space formed within the internal peripheral groove 52 configures an orifice 64 that mutually communicates the other pressure receiving fluid chamber 48 and the auxiliary fluid chamber 30. The passage length and the cross-sectional area of the pair of orifices 62 and 64 that communicate respectively the pair of pressure receiving fluid chambers 46 and 48 with the auxiliary fluid chamber 30, are tuned to correspond to a shake vibration that is a low frequency vibration (such as 8 to 12 Hz, for example).

In the vibration isolator 10 according to the present exemplary embodiment, the mounting direction is set such that, in the state in which it is mounted to a vehicle as an engine mount, of the radial directions with the axial center S as the center, the direction along which the pressure receiving fluid chamber 46, the mounting member 20 and the pressure receiving fluid chamber 48 are arranged, the main amplitude direction (the direction H in FIG. 2), substantially matches the vehicle up-down direction, and the device axial direction substantially matches the vehicle front-rear direction or substantially matches the vehicle left-right direction. Thereby, in the vibration isolator 10, when vibration (main vibration) is inputted along the main amplitude direction, which substantially matches the main amplitude direction through the outer cylinder 12 or through the mounting member 20, the rubber elastic body 22 elastically deforms in the main amplitude direction and also the rubber elastic body 22 changes (expands or contracts) the internal volume of the pair of the pressure receiving fluid chambers 46 and 48. When this occurs, the rubber elastic body 22 changes the internal volume of each of the pressure receiving fluid chambers 46 and 48 in directions that are mutually opposite to each other, that is to say when the internal volume of one of the pair of pressure receiving fluid chambers 46 and 48 is expanded, the internal volume of the other is contracted.

Explanation will now be given of the operation of the vibration isolator 10 according to the present exemplary embodiment that has been configured as described above.

In the vibration isolator 10, when an engine connected to the mounting member 20 is operated, vibrations from the engine are transmitted to the rubber elastic body 22 through the mounting member 20. When this occurs, the rubber elastic body 22 acts as a vibration absorbing main body, and the inputted vibrations are absorbed by damping action due to internal friction and the like of the rubber elastic body 22. When this occurs, the major vibrations input to the vibration isolator 10 from the engine may be seen as the vibration (main vibration) generated from the reciprocating movement of the pistons within the cylinders in the engine, and the vibration (secondary vibration) occurring with changes in the rotation speed of the crankshaft within the engine. When the engine is an in-line engine, the said main vibration has an amplitude direction (main amplitude direction) that substantially matches the vehicle up-down direction, and furthermore, the said secondary vibration has an amplitude direction (secondary amplitude direction) that is orthogonal to the amplitude direction of the main vibration that substantially matches either the vehicle front-rear direction (when the engine is transverse mounted) or the left-right direction (when the engine is longitudinal mounted). The rubber elastic body 22 is capable of absorbing the vibration by damping action due to internal friction and the like, both if the inputted vibration is the main vibration along the main amplitude direction, and if the inputted vibration is the secondary vibration along with the secondary amplitude direction.

In the vibration isolator 10, the one pressure receiving fluid chamber 46 is disposed at one side in the main amplitude direction between the outer cylinder 12 and the mounting member 20, and also the other pressure receiving fluid chamber 48 is disposed at the other side in the main amplitude direction between the outer cylinder 12 and the mounting member 20, and when vibration in the main amplitude direction is inputted to the outer cylinder 12 or to the mounting member 20, the internal volumes of the pair of pressure receiving fluid chambers 46 and 48 are respectively changed (expanded or contracted). Since, therefore, the fluid pressures inside the pair of pressure receiving fluid chambers 46 and 48 also change (increases or decreases), fluid flows to-and-fro through the one orifice 62 between the pressure receiving fluid chamber 46 and the auxiliary fluid chamber 30, and fluid flows to-and-fro through the other orifice 64 between the pressure receiving fluid chamber 48 and the auxiliary fluid chamber 30.

When this occurs, the lengths and the cross-sectional areas of the orifices 62 and 64, that is to say the resistance to fluid flow, are tuned to correspond to a shake vibration that is of a low frequency vibration (8 to 12 Hz, for example), and therefore the when the inputted vibration is the shake vibration, resonance phenomena occurs (liquid column resonance) in the fluid flowing to-and-fro through the one orifice 62 between the pressure receiving fluid chamber 46 and the auxiliary fluid chamber 30, and liquid column resonance also occurs in the fluid flowing to-and-fro through the other orifice 64 between the pressure receiving fluid chamber 48 and the auxiliary fluid chamber 30. Therefore inputted vibration (shake vibration) in the main amplitude direction may be effectively absorbed by the liquid column resonance occurring in the pair of orifices 62 and 64.

Furthermore, when the rubber elastic body 22 elastically deforms, due to the inputted vibration in the main amplitude direction of the direction of alignment of the pressure receiving fluid chamber 46, the mounting member 20 and the pressure receiving fluid chamber 48, along with elastic deformation in the main amplitude direction, the rubber elastic body 22 changes the internal volumes of each of the pair of pressure receiving fluid chambers 46 and 48 in directions that are mutually opposite to each other (expands one and contracts the other) and changes the fluid pressures within each of the pair of pressure receiving fluid chambers 46 and 48 in directions that are mutually opposite to each other (lowers one and raises the other). Thereby, when vibration in the main amplitude direction is input, independent of the frequency of the inputted vibration, when fluid flows into the auxiliary fluid chamber 30 from the pressure receiving fluid chamber 46 through the orifice 62, fluid also flows out from the auxiliary fluid chamber 30 to the pressure receiving fluid chamber 48 through the other orifice 64. Therefore, even though the frequency of the inputted vibration is outside of the frequency region corresponding to the orifices 62 and 64, the fluid pressure within the auxiliary fluid chamber 30 is always maintained substantially constant, and an increase in the fluid pressure within the auxiliary fluid chamber 30 is suppressed.

That is, in the auxiliary fluid chamber 30, since a portion of partitioning wall is formed from the low rigidity diaphragm 28, naturally (ideally), even if fluid flows into the auxiliary fluid chamber 30, rising of fluid pressure is not generated within the auxiliary fluid chamber 30. However, in reality, when the durability of the diaphragm 28 and the like are considered, it is difficult to make the rigidity of the diaphragm 28 sufficiently small, and therefore when the fluid inflow amount to the auxiliary fluid chamber 30 becomes greater than the fluid outflow amount, a rise in the fluid pressure may occur, corresponding to the difference between the inflow amount and the outflow amount within the auxiliary fluid chamber 30. However, in the vibration isolator 10 according to the present exemplary embodiment, when vibration is inputted in the main amplitude direction, since the fluid inflow amount and outflow amount of the auxiliary fluid chamber 30 become substantially equal, any rise in the fluid pressure within the auxiliary fluid chamber 30 can be made sufficiently small.

Therefore, according to the vibration isolator 10 of the present exemplary embodiment, when vibration is inputted in the main amplitude direction, even if the frequency of the inputted vibration is outside of the frequency region corresponding to the orifices 62 and 64, an increase in the flow resistance of fluid flowing through the one orifice of the orifice 62 between the pressure receiving fluid chamber 46 and the auxiliary fluid chamber 30 and an increase in the flow resistance of fluid flowing through the other orifice of the orifice 64 between the pressure receiving fluid chamber 48 and the auxiliary fluid chamber 30, due to an increase in the fluid pressure within the auxiliary fluid chamber 30, can be suppressed. Therefore, when one of the pressure receiving fluid chambers 46 and 48 contracts, there is a smooth flow, with low resistance, of liquid out from the one of the pressure receiving fluid chambers 46 and 48, through the respective orifice 62 and 64, to the inside of the auxiliary fluid chamber 30. As a result of this, a rise in the fluid pressure within the pair of pressure receiving fluid chambers 46 and 48 can be suppressed, and therefore a rise in the dynamic spring constant of the device can be suppressed.

Further, if the frequency of the inputted vibration is within the frequency region corresponding to the orifices 62 and 64, the change in the fluid pressure within the auxiliary fluid chamber 30 (fluid pressure rise) becomes small, and there is no impediment to fluid flow within the restrict passage by a rise in the fluid pressure within the auxiliary fluid chamber 30. Therefore, fluid flows smoothly, with low resistance, through the pair of orifices 62 and 64, between each respective chamber of the pair of pressure receiving fluid chambers 46 and 48 and the auxiliary fluid chamber 30. As a result of this, the damping effect, due to fluid being in a state of liquid column resonance within the respective of the orifices 62 and 64, can be effectively increased.

Furthermore, in the vibration isolator 10 according to the present exemplary embodiment, since the cross-section of the partitioning wall portion 38 in the rubber elastic body 22 is curved so as to protrude in a convex shape toward the inside of the pressure receiving fluid chambers 46 and 48, when vibration has been input in the main amplitude direction, effective expansion and contraction of the internal volume of the pressure receiving fluid chambers 46 and 48 can be achieved in comparison to a case in which the partitioning wall portion 38 is a flat plate shape, or in comparison to a curved shape so as to protrude in a convex shape toward the outside of the pressure receiving fluid chambers 46 and 48.

That is, in the vibration isolator 10, along with the input of vibration in the main amplitude direction, the mounting member 20 relatively displaces to one end side in the main amplitude direction, and one of the pressure receiving fluid chambers 46 and 48 disposed at one end side in the main amplitude direction compresses, and the other of the pressure receiving fluid chambers 46 and 48 disposed at the other end side expands. When this occurs, in the vibration isolator 10, one end side of the partitioning wall portion 38 elastically deforms (flexure deformation) so that there is an increase in the amount that it intrudes (amount of curvature) in toward one of the pressure receiving fluid chambers 46 and 48, and at the same time the other end side of the partitioning wall portion 38 elastically deforms so that there is a decrease in the amount that it intrudes (amount of curvature) in toward the other of the pressure receiving fluid chambers 46 and 48. Thereby, in the vibration isolator 10, when vibration is inputted in the main amplitude direction, the reduction in internal volume of the one of the pressure receiving fluid chambers 46 and 48 that is deforming by compressing is effectively promoted, and also the increase in the internal volume of the other of the pressure receiving fluid chambers 46 and 48 that is expanding is effectively promoted, when compared with a case in which the partitioning wall portion 38 is a flat plate shape, or compared with a curved shape so as to protrude in a convex shape toward the outside of the pressure receiving fluid chambers 46 and 48.

As a result, by the vibration isolator 10 according to the present exemplary embodiment, when vibration is inputted in the main amplitude direction, the amount of fluid flowing via the orifices 62 and 64 between the pressure receiving fluid chambers 46 and 48 and the auxiliary fluid chamber 30 can be effectively promoted, and therefore, inputted vibrations in the secondary amplitude direction can be effectively absorbed by the viscous resistance of fluid flowing within the orifices 62 and 64, and by pressure changes.

It should be noted that, in the vibration isolator 10 according to the present exemplary embodiment, the outer cylinder 12 is attached to the vehicle body side via a bracket member, and also the connection fastener 36 is attached to the engine side via a bolt, however, this may be reversed, and the outer cylinder 12 may be attached to the engine side and the mounting member 20 may be attached through the bolt to the vehicle body side.

Furthermore, in the vibration isolator 10, tuning is carried out such that the passage lengths and the cross-sectional areas of the orifices 62 and 64 correspond to the shake vibration that is low frequency vibration (such as, for example, 8 to 12 Hz), however, the frequency range corresponding to the pair of orifices 62 and 64 can be adjusted by changing the passage lengths and the cross-sectional areas of the orifices 62 and 64.

Second Exemplary Embodiment

Figure 4:
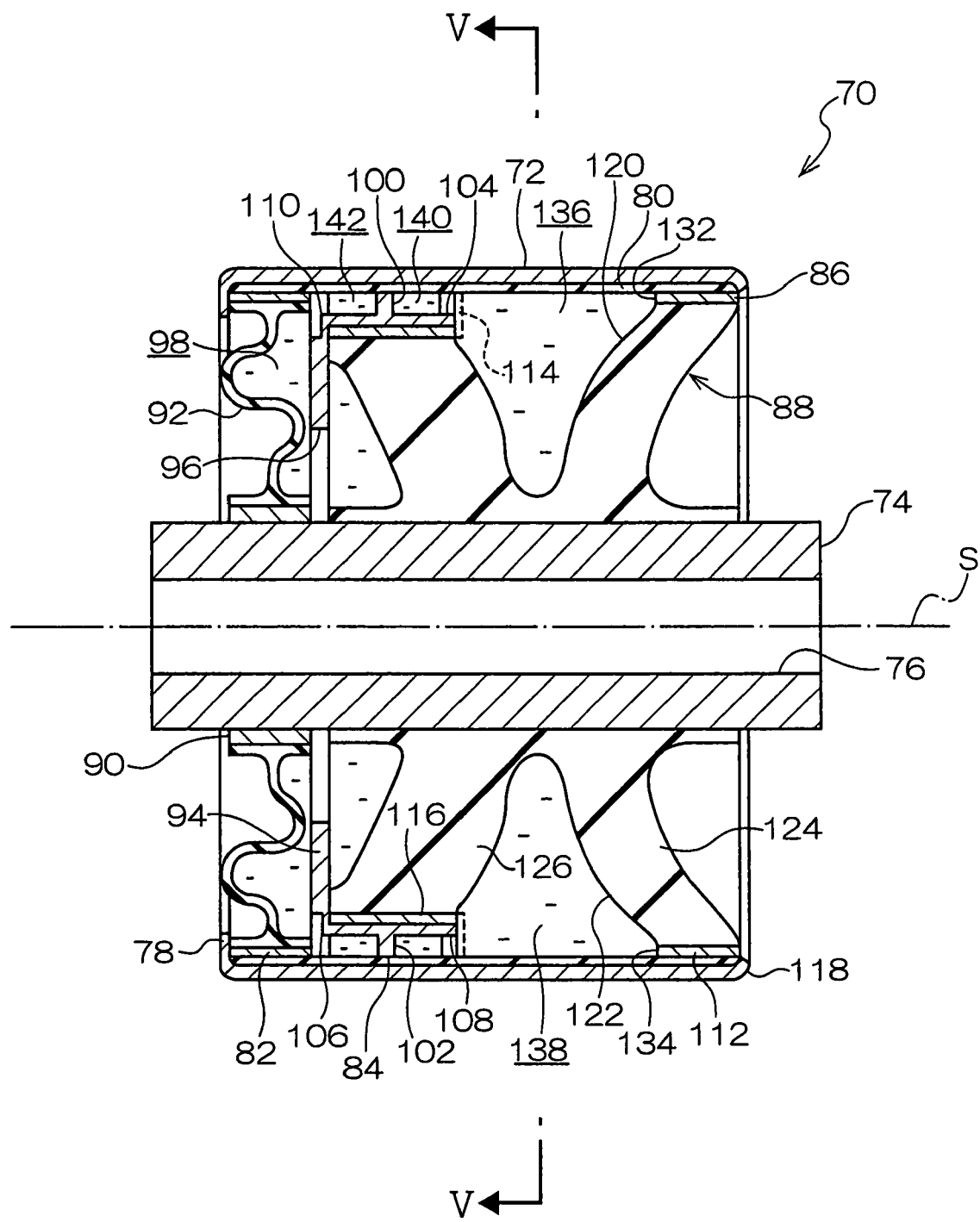
FIG. 4 is a side view cross-section showing a configuration of a vibration isolator according to a second exemplary embodiment of the present invention.

A vibration isolator according to a second exemplary embodiment of the present invention is shown in FIG. 4. This vibration isolator 70 is one that is used in an engine mount of a vehicle, supporting an engine, which is a vibration generating portion, on a vehicle body, which is a vibration receiving unit, in a manner that isolates vibrations. It should be noted that in the figures, the indicator S shows the axial center of the device, and explanation will be given below with "device axial direction" referring to the direction along this axial center S, and with "device radial direction" referring to a direction that is perpendicular to this axial center S.

As shown in FIG. 4, in the vibration isolator 70, there is provided a metal outer cylinder 72, which is formed into a thin-walled, substantially circular cylindrical shape that is open at both ends in the axial direction thereof, at the outer peripheral side, and at the internal peripheral side of this outer cylinder 72 is disposed a metal internal cylinder 74 that is formed into a thick-walled circular cylindrical shape. The internal cylinder 74 passes through the outer cylinder 72 at the inner peripheral side thereof, and both ends of the internal cylinder 74 protrude out respectively from the inside of the outer cylinder 72. There is a connecting hole 76 passing through the internal cylinder 74 along the axial center S. There is a bent portion 78 formed at one end portion in the axial direction (at the left end side in FIG. 4) of the outer cylinder 72, formed so as to be bent and extend toward the inner peripheral side.

In the vibration isolator 70, there is also a bracket member (not shown in the drawings) provided fixed to the outer peripheral side of the outer cylinder 72, the outer cylinder 72 is attached to the vehicle body side via this bracket member, and the internal cylinder 74 is connected to the engine side by a connecting member such as a bolt or the like (not shown in the drawings), which has passed through the inside of the connecting hole 76 of the internal cylinder 74.

There is a thin membrane-shaped covering rubber 80 made of rubber bonded by vulcanization to the whole of the inner peripheral face of the outer cylinder 72, and an outer peripheral support fastening 82, a first partitioning member 84 and an intermediate cylinder 86 are inserted and fitted in, in this sequence, toward one end side in the axial direction of the outer cylinder 72, from the other end side thereof. In the vibration isolator 70 there is a rubber elastic body 88 disposed between the intermediate cylinder 86 and the internal cylinder 74. This rubber elastic body 88 is formed overall into a thick, circular cylindrical shape, the inner peripheral face thereof being bonded by vulcanization to the outer peripheral face of the internal cylinder 74, and the outer peripheral face thereof being bonded by vulcanization to the inner peripheral face of the intermediate cylinder 86. In this manner the internal cylinder 74 and the intermediate cylinder 86 are connected together elastically via the rubber elastic body 88.

The outer peripheral support fastening 82 is formed into a thin-walled circular cylindrical shape that is short in the axial direction, and the outer peripheral face of the outer peripheral support fastening 82 is pressure bonded to the inner peripheral face of the outer cylinder 72 via the covering rubber 80, and the other end portion in the axial direction of the outer peripheral support fastening 82 abuts the bent portion 78 of the outer cylinder 72. There is further an inner peripheral support fastening 90, which is formed into a thin-walled circular cylindrical shape, disposed in the vibration isolator 70 at the inner peripheral side of the outer peripheral support fastening 82, the inner peripheral support fastening 90 being press fitted to the outer peripheral side of the internal cylinder 74, with a portion at the other end thereof abutted against a bottom plate portion 94 of the first partitioning member 84. A thin membrane circular plate-shaped diaphragm 92 is disposed between the outer peripheral support fastening 82 and the inner peripheral support fastening 90, and the whole of the circumference of the outer peripheral portion of the diaphragm 92 is bonded by vulcanization to the inner peripheral face of the outer peripheral support fastening 82, and also the whole of the circumference of the inner peripheral portion of the diaphragm 92 is bonded by vulcanization to the outer peripheral face of the inner peripheral support fastening 90. Here, the diaphragm 92 curves in a wave-like form, in cross-section along a radial direction, and adopts a slack shape. Thereby, the diaphragm 92 deforms with relatively small resistance in accordance with changes in the fluid pressure inside an auxiliary fluid chamber 98, described later, and the internal volume of the auxiliary fluid chamber 98 is able to expand and contract.

Figure 6:
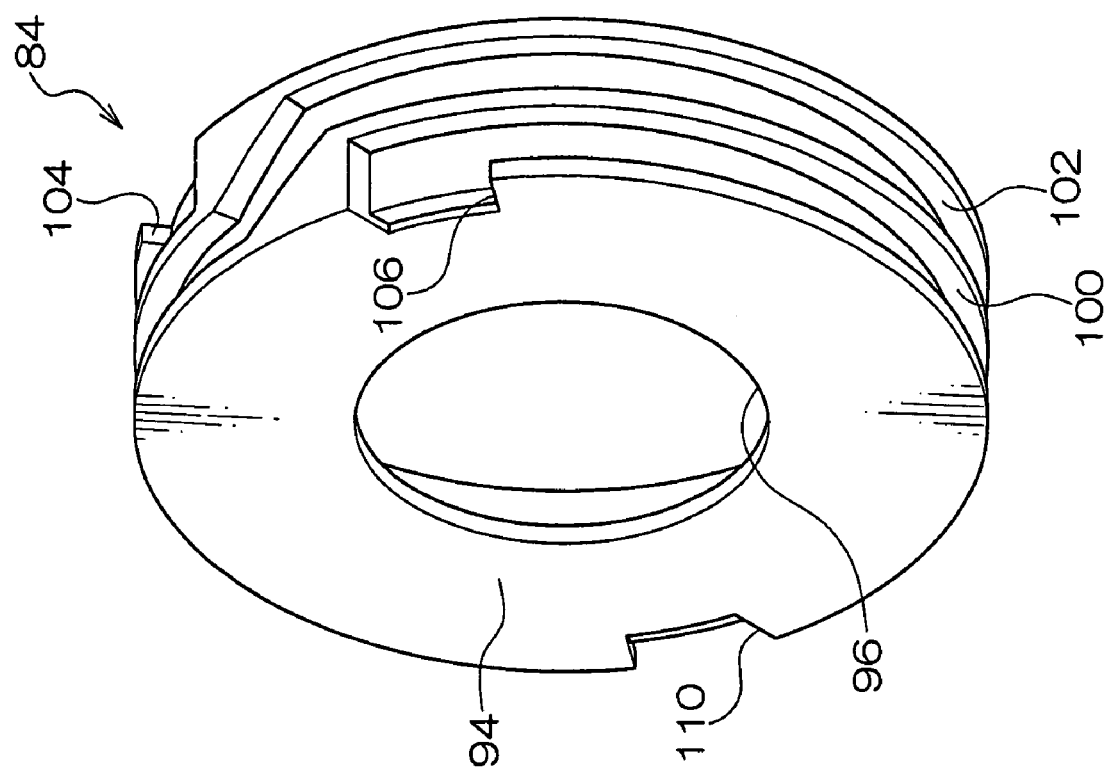
FIG. 6 is perspective view showing a configuration of a first dividing member in the vibration isolator shown in FIG. 4.

As shown in FIG. 4, the resin first partitioning member 84 is inserted and fitted inside the outer cylinder 72 so as to be adjacent to the outer peripheral support fastening 82. The other end of the first partitioning member 84, at the side of the outer peripheral support fastening 82, is formed with a bottomed circular cylindrical shaped bottom plate portion 94. As shown in FIG. 6, there is an opening 96 formed in a circular shape at the central portion of the bottom plate portion 94. There are spaces (fluid chambers) formed in the vibration isolator 70, inside the outer cylinder 72 between the diaphragm 92 and the bottom plate portion 94, and between the bottom plate portion 94 and the rubber elastic body 88, these spaces being respectively partitioned off from the outside, but mutually communicated with each other through the opening 96 of the bottom plate portion 94. This fluid chamber is filled with a fluid, such as ethylene glycol, silicone oil or the like, and forms the auxiliary fluid chamber 98.

As shown in FIG. 4, at the first partitioning member 84, the one end portion of the outer peripheral support fastening 82 abuts against the outer peripheral side of the bottom plate portion 94. The first partitioning member 84 is thereby clamped and supported, restrained from moving in the axial direction, between the bent portion 78 of the outer cylinder 72 and the first partitioning member 84. The outer peripheral face of the first partitioning member 84 is also pressed against the inner peripheral face of the outer cylinder 72, with the covering rubber 80 therebetween.

In the first partitioning member 84, as shown in FIG. 6, there is a thin, long, outer peripheral groove 100 formed extending in a spiral shape at the outer peripheral face thereof, and there is also a thin, long, outer peripheral groove 102, formed extending in a spiral shape that is of the opposite rotation direction to that of the outer peripheral groove 100, at the outer peripheral face thereof. These outer peripheral grooves 100, 102 extend, respectively, around nearly a complete circumference of the outer peripheral face of the first partitioning member 84. Furthermore, in the first partitioning member 84, as shown in FIG. 4, there are a communication opening 104 and a communication opening 106 formed, respectively, at one end and the other end of the outer peripheral groove 100, to respectively penetrate outer side in the axial direction, and there are a communication opening 108 and a communication opening 110 formed, respectively, at one end and the other end of the outer peripheral groove 102, to respectively penetrate outer side in the axial direction.

As shown in FIG. 4, there is a large diameter circular cylindrical shaped large diameter portion 112 formed at one end side in the axial direction of the intermediate cylinder 86, and there is a circular cylindrical shaped small diameter portion 116, having a smaller diameter than that of the large diameter portion 112 and integrally formed thereto via a step portion 114 that extends toward the inner peripheral side from the other end side of the large diameter portion 112. The small diameter portion 116 here has an outer diameter that corresponds to the internal diameter of the first partitioning member 84. In the intermediate cylinder 86, the outer peripheral face of the large diameter portion 112 is pressed against the inner peripheral face of the outer cylinder 72, with the covering rubber 80 therebetween, and the small diameter portion 116 is inserted and fitted into the inner peripheral side of the first partitioning member 84. When this is being carried out, in the intermediate cylinder 86, the step portion 114 contacts with one end face of the first partitioning member 84. The first partitioning member 84 is thereby held clamped by the outer peripheral support fastening 82 and the step portion 114, and movement in the axial direction is restrained. Furthermore, after inserting and fitting the intermediate cylinder 86 to the inner peripheral side of the outer cylinder 72, a crimped portion 118 is formed at one end of the outer cylinder 72, by bending toward the inner peripheral side thereof. The intermediate cylinder 86 is thereby held clamped by the first partitioning member 84 and the crimped portion 118, and movement thereof in the axial direction is restrained.

As shown in FIG. 4, there is a pair of hollow portions 120 and 122 formed to the rubber elastic body 88, as concave shapes from the outer peripheral side of the large diameter portion 112 toward the internal peripheral side thereof at the internal peripheral side of the large diameter portion 112. These hollow portions 120 and 122 are provided at one end side and the other end side, respectively, of the rubber elastic body 88, with the internal cylinder 74 in the radial direction between the hollow portion 120 and the hollow portion 122, and the hollow portions 120 and 122 are formed into substantially V-shapes, with the width along axial direction cross-section getting gradually narrower on progression from the outer peripheral side to the internal peripheral side thereof.

Figure 5:
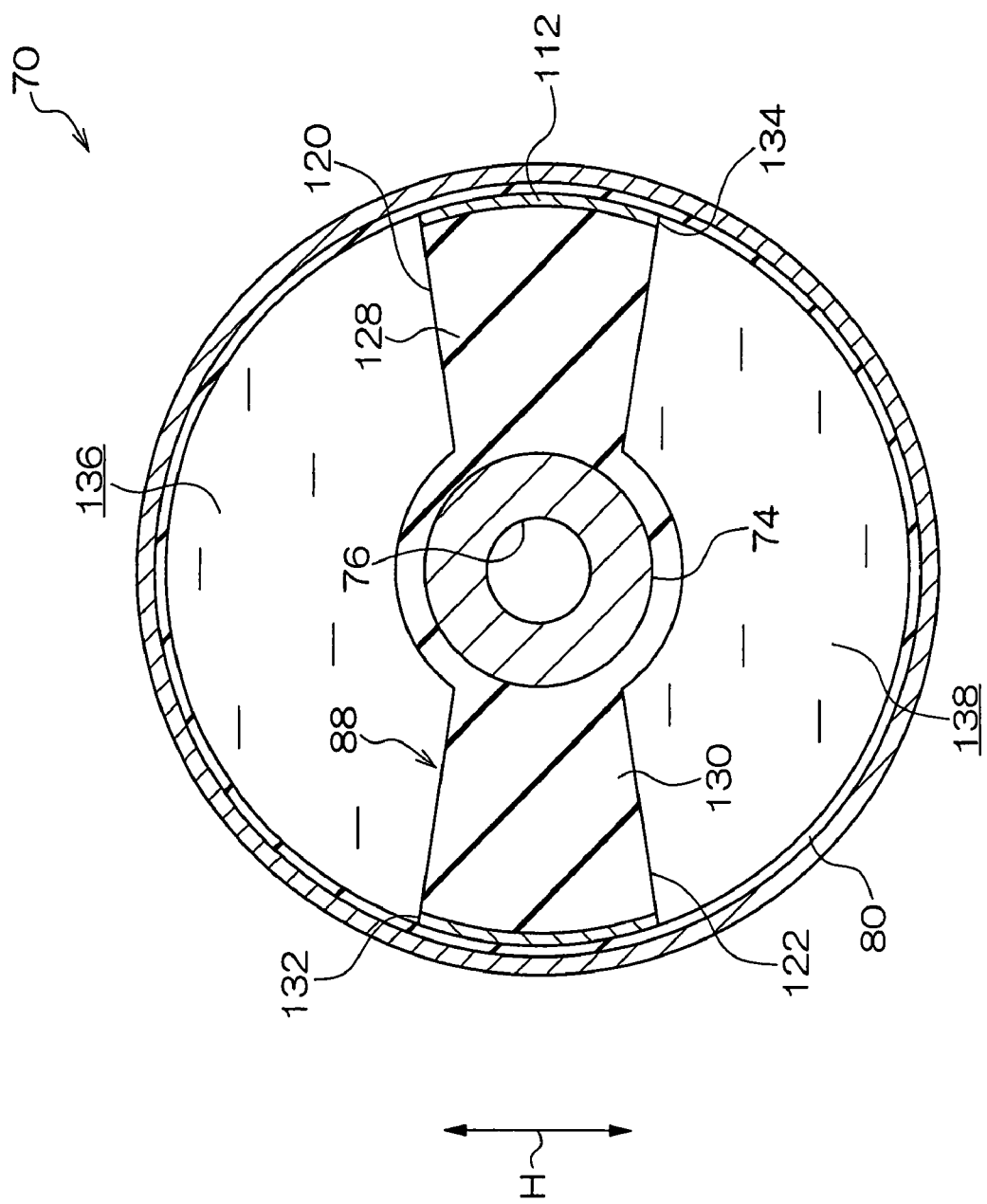
FIG. 5 is a cross-section taken along V-V of the vibration isolator shown in FIG. 4.

As shown in FIG. 5, there is a partitioning wall portion 124 formed in a substantially circular plate shape to one end in the axial direction of the rubber elastic body 88. The partitioning wall portion 124 is of substantially constant thickness in the axial direction at given positions on the radial direction thereof, and the inner peripheral face of the partitioning wall portion 124 is bonded by vulcanization to the outer peripheral surface at one end side of the internal cylinder 74, and the outer peripheral face thereof is bonded by vulcanization to the internal peripheral face of the large diameter portion 112 of the intermediate cylinder 86. The partitioning wall portion 124 is formed here into a curved shape in cross-section in the axial direction, protruding in a convex manner toward the inside of the hollow portions 120 and 122.

There is a partitioning wall portion 126 formed in a substantially circular thick-walled plate shape to the opposite end in the axial direction of the rubber elastic body 88 to that of the partitioning wall portion 124, with the hollow portions 120 and 122 therebetween. The partitioning wall portion 126 also has a substantially constant wall axial direction thickness at given positions along the radial direction, and the inner peripheral face of the partitioning wall portion 126 is bonded by vulcanization to the outer peripheral face of the internal cylinder 74, and the outer peripheral face of the partitioning wall portion 126 is bonded to the inner peripheral face of the small diameter portion 116 of the intermediate cylinder 86.

As shown in FIG. 5, there is a pair of dividing walls 128 and 130 formed integrally to the rubber elastic body 88, the dividing walls 128 and 130 each extending out from the center portion to the outer peripheral side along radial directions. These dividing walls 128 and 130 are each formed in a plate shape with a wall thickness in the circumferential direction that gradually gets thicker on progression from the internal peripheral side to the outer peripheral side, and the dividing walls 128 and 130 extend out in opposite directions from each other with the internal cylinder 74 at the center thereof. Outer peripheral edge portions of this pair of dividing walls 128 and 130 are each bonded by vulcanization to the inner peripheral face of the large diameter portion 112 of the intermediate cylinder 86. The space that is formed between the partitioning wall portion 124 and the partitioning wall portion 126 in the rubber elastic body 88 is thereby divided up, by the dividing wall 128 and the dividing wall 130, into the hollow portion 120 and the hollow portion 120. Furthermore, there is an opening portion 132 and an opening portion 134, formed, respectively, of a rectangular shape to the large diameter portion 112 of the intermediate cylinder 86 and facing each of the hollow portion 120 and the hollow portion 120.

In the vibration isolator 70, as shown in FIG. 5, the outer peripheral side of the hollow portions 120 and 122 is closed off, via the covering rubber 80, by the inner peripheral face of the outer cylinder 72, and the internal portions of the hollow portions 120 and 122 each form a fluid chamber that is separated from the outside. Each chamber of this pair of fluid chambers is filed with the same liquid as the auxiliary fluid chamber 98, and form a pair of first pressure receiving fluid chambers 136 and 138.

The outer peripheral sides of the pair of outer peripheral grooves 100, 102 in the first partitioning member 84 are closed off by the inner peripheral face of the outer cylinder 72, via the covering rubber 80. The one outer peripheral groove 100 that has been closed off at the outer peripheral side is configured with a first orifice 140, mutually communicating the first pressure receiving fluid chamber 136 and the auxiliary fluid chamber 98, and the other outer peripheral groove 102 is configured with a first orifice 142 that mutually communicates the first pressure receiving fluid chamber 136 and the auxiliary fluid chamber 98. The passage length and the cross-sectional area of the pair of first orifices 140, 142 are tuned to correspond to a shake vibration that is a low frequency vibration (such as 8 to 12 Hz, for example).

In the vibration isolator 70 according to the present exemplary embodiment, the mounting direction is set such that, in the state in which it is mounted to a vehicle as an engine mount, of the radial directions with the axial center S as the center, the direction along which the first pressure receiving fluid chamber 136, the internal cylinder 74 and the first pressure receiving fluid chamber 138 are arranged, that is the main amplitude direction (the direction H in FIG. 5) substantially matches the vehicle up-down direction, and the device axial direction substantially matches the vehicle front-rear direction or matches the left-right direction. Thereby, in the vibration isolator 70, when vibration (main vibration) is inputted in the main amplitude direction, which substantially matches the main amplitude direction via the outer cylinder 72 or through the internal cylinder 74, the rubber elastic body 88 elastically deforms in the main amplitude direction and also the rubber elastic body 88 changes (expands or contracts) the internal volume of the pair of the first pressure receiving fluid chambers 136 and 138. When this occurs, the rubber elastic body 88 changes the internal volume of each of the first pressure receiving fluid chambers 136 and 138 in directions that are mutually opposite to each other, that is to say when the internal volume of one of the pair of first pressure receiving fluid chambers 136 and 138 is expanded, the internal volume of the other is contracted.

Explanation will now be given of the operation of the vibration isolator 70 according to the present exemplary embodiment that has been configured as described above.

In the vibration isolator 70, when an engine connected to the internal cylinder 74 is operated, the vibrations from the engine are transmitted to the rubber elastic body 88 via the internal cylinder 74. When this occurs, the rubber elastic body 88 acts as a vibration absorbing main body, and inputted vibrations are absorbed by damping action due to internal friction and the like of the rubber elastic body 88.

In the vibration isolator 70, the one first pressure receiving fluid chamber 136 is disposed at one side in the main amplitude direction between the outer cylinder 72 and the internal cylinder 74, and the other first pressure receiving fluid chamber 138 is disposed at the other side in the main amplitude direction between the outer cylinder 72 and the internal cylinder 74, and when vibration in the main amplitude direction is inputted to the outer cylinder 72 or the internal cylinder 74, the internal volumes of the pair of first pressure receiving fluid chambers 136 and 138 are respectively changed (expanded or contracted). Therefore, since the fluid pressures inside the pair of first pressure receiving fluid chambers 136 and 138 also change (increases or decreases), fluid flows to-and-fro through the one first orifice 140 between the first pressure receiving fluid chamber 136 and the auxiliary fluid chamber 98, and fluid flows to-and-fro through the other first orifice 142 between the first pressure receiving fluid chamber 138 and the auxiliary fluid chamber 98.

When this occurs, the length and the cross-sectional area of the first orifices 140 and 142, that is to say the resistance to fluid flow, are tuned to correspond to a shake vibration that is of a low frequency vibration (8 to 12 Hz, for example), and therefore when the inputted vibration is the shake vibration, resonance occurs (liquid column resonance) in the fluid flowing to-and-fro through the one first orifice 140 between the first pressure receiving fluid chamber 136 and the auxiliary fluid chamber 98, and liquid column resonance also occurs in the fluid flowing to-and-fro through the other first orifice 142 between the first pressure receiving fluid chamber 138 and the auxiliary fluid chamber 98. Therefore, inputted vibration (shake vibration) in the main amplitude direction can be effectively absorbed by the liquid column resonance occurring in the pair of first orifices 140 and 142.

Furthermore, in the vibration isolator 70 when the rubber elastic body 88 elastically deforms, due to the inputted vibration in the main amplitude direction of alignment of the first pressure receiving fluid chamber 136, the internal cylinder 74 and the first pressure receiving fluid chamber 138, along with the elastic deformation in the main amplitude direction, the rubber elastic body 88 changes the internal volumes of each of the pair of first pressure receiving fluid chambers 136 and 138 in directions that are mutually opposite to each other (expands one and contracts the other) and changes the fluid pressures within each of the pair of first pressure receiving fluid chambers 136 and 138 in directions that are mutually opposite to each other (lowers one and raises the other). Thereby, while vibration in the main amplitude direction is inputted, independent of the frequency of the inputted vibration, when fluid flows into the auxiliary fluid chamber 98 from the first pressure receiving fluid chamber 136 through the first orifice 140, fluid also flows out from the auxiliary fluid chamber 98 to the first pressure receiving fluid chamber 136 through the other first orifice 142. Therefore, even if the frequency of the inputted vibration is outside of the frequency region corresponding to the first orifices 140 and 142, the fluid pressure within the auxiliary fluid chamber 98 is always maintained substantially constant.

That is, in the auxiliary fluid chamber 98, since a portion of partitioning wall is formed from the low rigidity diaphragm 92, naturally (ideally), even if fluid flows into the auxiliary fluid chamber 98, rising of fluid pressure is not generated within the auxiliary fluid chamber 98. However, in reality, when the durability of the diaphragm 92 and the like are considered, it is difficult to make the rigidity of the diaphragm 92 sufficiently small, and therefore when the fluid inflow amount to the auxiliary fluid chamber 98 becomes greater than the fluid outflow amount, a rise in the fluid pressure may occur, corresponding to the difference between the inflow amount and the outflow amount within the auxiliary fluid chamber 98. However, in the vibration isolator 70 according to the present exemplary embodiment, when vibration is inputted in the main amplitude direction, since the fluid inflow amount and outflow amount of the auxiliary fluid chamber 98 become substantially equal, any rise in the fluid pressure within the auxiliary fluid chamber 98 can be made sufficiently small.

Therefore, according to the vibration isolator 70 of the present exemplary embodiment, when vibration is inputted along the main amplitude direction, even if the frequency of the inputted vibration is outside of the frequency region corresponding to the first orifices 140 and 142, an increase in the flow resistance of fluid flowing through one orifice of the first orifice 140 between the first pressure receiving fluid chamber 136 and the auxiliary fluid chamber 98, and an increase in the flow resistance of fluid flowing through the other orifice of the first orifice 142 between the first pressure receiving fluid chamber 138 and the auxiliary fluid chamber 98, due to an increase in the fluid pressure within the auxiliary fluid chamber 98, can both be suppressed. Therefore, when one of the first pressure receiving fluid chambers 136 and 138 contracts, there is a smooth flow, with low resistance, of liquid out from the one of the first pressure receiving fluid chambers 136 and 138, through the first orifices 140 and 142, to the inside of the auxiliary fluid chamber 98. As a result of this, a rise in the fluid pressure within the pair of first pressure receiving fluid chambers 136 and 138 can be suppressed, and therefore a rise in the dynamic spring constant of the device may be suppressed.

Also, if the frequency of the inputted vibration is within the frequency region corresponding to the first orifices 140 and 142, there is no change generated in the fluid pressure within the auxiliary fluid chamber 98 (fluid pressure rise), and there is no impediment to fluid flow within the restrict passage by the fluid pressure within the auxiliary fluid chamber 98, and therefore fluid flows smoothly, with low resistance, through the pair of first orifices 140 and 142 between each of the respective pair of first pressure receiving fluid chambers 136 and 138 and the auxiliary fluid chamber 98. As a result of this, the damping, due to fluid being in liquid column resonance within the respective of the first orifices 140 and 142 can be effectively increased.

Furthermore, in the vibration isolator 70 according to the present exemplary embodiment, since the cross-section of the partitioning wall portion 124 in the rubber elastic body 88 is curved so as to protrude in a convex shape toward the inside of the first pressure receiving fluid chambers 136 and 138, in the same manner as with the vibration isolator 10 according to the first exemplary embodiment, when vibration has been input in the main amplitude direction, effective expansion and contraction of the internal volume of the first pressure receiving fluid chambers 136 and 138 can be achieved, in comparison to a case in which the partitioning wall portion is a flat plate shape, or a curved shape so as to protrude in a convex shape toward the outside of the first pressure receiving fluid chambers 136 and 138.

As a result, in the vibration isolator 70 according to the present exemplary embodiment, when vibration is inputted in the main amplitude direction, the amount of fluid flowing in the first orifices 140 and 142 between the first pressure receiving fluid chambers 136 and 138 and the auxiliary fluid chamber 98 can be effectively promoted. Therefore, inputted vibrations in the secondary amplitude direction can be effectively absorbed by the viscous resistance of fluid flowing within the first orifices 140 and 142, and by pressure changes.

It should be noted that, in the vibration isolator 70 according to the present exemplary embodiment, the outer cylinder 72 is attached to the vehicle body side via a bracket member, and also the internal cylinder 74 is attached to the engine side through a connecting member, however, this may be reversed, and the outer cylinder 72 may be attached to the engine side and the internal cylinder 74 may be attached via a connecting member to the vehicle body side.

Furthermore, in the vibration isolator 70, tuning is carried out such that the passage lengths and the cross-sectional areas of the first orifices 140 and 142 correspond to shake vibrations that are low frequency vibrations (such as, for example, 8 to 12 Hz), however, the frequency range corresponding to the pair of first orifices 140 and 142 may be adjusted by changing the passage lengths and the cross-sectional areas of the first orifices 140 and 142.

In the vibration isolator 70 according to the present exemplary embodiment, since the internal cylinder 74, which is a mounting member, passes through the inside of the outer cylinder 72, the load of the engine can be made to act more uniformly over the entire length of the internal cylinder 74, in comparison with the vibration isolator 10 according to the first exemplary embodiment. Thereby, since the internal cylinder 74 does not relatively incline with respect to the outer cylinder 72 when load is input, deformation (compression or extension deformation) can be made uniform in the radial direction at given locations along the axial direction in the rubber elastic body 88. As a result of this, by the vibration isolator 70 according to the present exemplary embodiment, the durability of the rubber elastic body 88 can be increased and there is effective expansion and contraction of the internal volume of the first pressure receiving fluid chambers 136 and 138 when vibration is input, in comparison to the vibration isolator 10 according to the first exemplary embodiment.

Third Exemplary Embodiment

Figure 7:
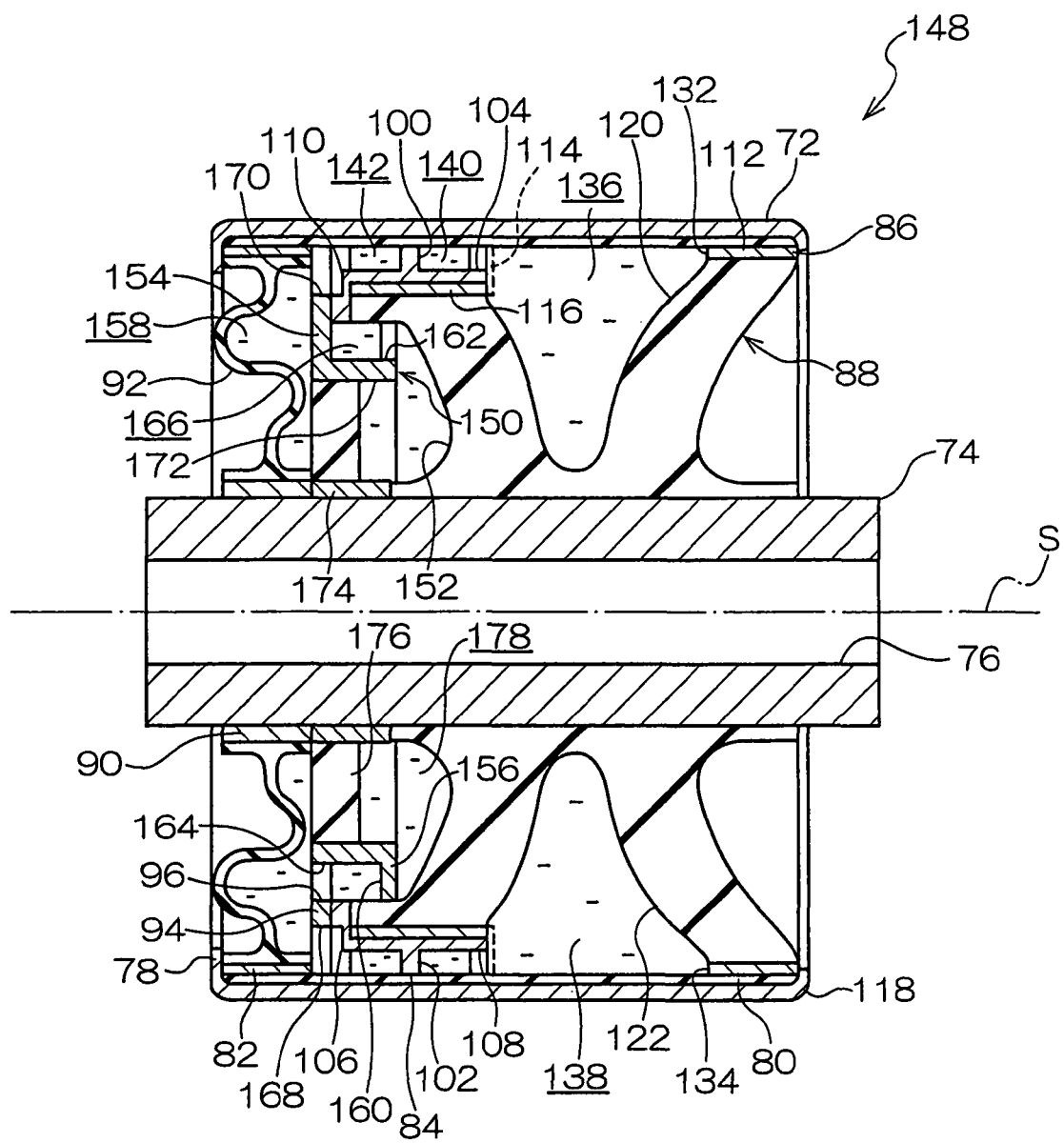
FIG. 7 is a side face cross-section showing a configuration of a vibration isolator according to a third exemplary embodiment of the present invention.

A vibration isolator according to a third exemplary embodiment of the present invention is shown in FIG. 7. This vibration isolator 148, as with the vibration isolator 70 according to the second exemplary embodiment, is one that is used in an engine mount of a vehicle. In the vibration isolator 148 according to the present exemplary embodiment, the components that are similar to those of vibration isolator 70 according to the second exemplary embodiment are allocated the same reference numerals, and explanation thereof will be omitted.

The vibration isolator 148 according to the present exemplary embodiment is different from the vibration isolator 70 according to the first exemplary embodiment in the point that in the outer cylinder 72, there is a second partitioning member 150 disposed additionally between the outer peripheral support fastening 82 and the first partitioning member 84. The second partitioning member 150 is formed in a circular plate shape that has an internal peripheral side that is thicker than the outer peripheral side, and an extending portion 154 is integrally formed thereto, extending out in a flange shape to the outer peripheral side at the other end portion of the outer peripheral face of the second partitioning member 150. There is an orifice forming portion 156 formed in a circular protrusion shape that protrudes out toward the rubber elastic body 88 side at the internal peripheral side of the extending portion 154.

The second partitioning member 150 inserts and fits the orifice forming portion 156 through the opening 96 of the first partitioning member 84 into a recess portion 152 that has been formed in a central portion at end face of the rubber elastic body 88, and also the second partitioning member 150 contacts the extending portion 154 with the other end face of the first partitioning member 84. Furthermore, the outer peripheral side of the extending portion 154 of the second partitioning member 150 is clamped between the outer peripheral support fastening 82 and the first partitioning member 84, and movement in the axial direction thereof is restrained. By so doing, in the vibration isolator 148, a fluid chamber space that is formed inside the outer cylinder 72 between the diaphragm 92 and the rubber elastic body 88, is divided into two individual small spaces. The small space on the diaphragm 92 side of these small spaces is filled with a fluid such as ethylene glycol, silicone oil or the like, and is an auxiliary fluid chamber 158. The small space on the rubber elastic body 88 side is filled with the same fluid as that in the auxiliary fluid chamber 158 and is a second pressure receiving fluid chamber 178.

There is an outer peripheral groove 160 formed as a recess shape in the outer peripheral face of the orifice forming portion 156 of the second partitioning member 150, formed extending along the circumferential direction thereof around nearly a complete circumference. There is also an inner peripheral cutout portion 162 formed to the second partitioning member 150, facing one end portion of the outer peripheral groove 160 and passing through to the second pressure receiving fluid chamber 178 side. There is also an inner peripheral cutout portion 164 formed to the second partitioning member 150, facing the other end portion of the outer peripheral groove 160 and passing through to in the axial direction auxiliary fluid chamber 158 side. The outer peripheral side of the outer peripheral groove 160 is closed by the internal peripheral face of the first partitioning member 84 and the internal peripheral face of the recess portion 152 of the rubber elastic body 88. The outer peripheral groove 160, with the outer peripheral side thereof closed off, is a second orifice 166 that mutually communicates the second pressure receiving fluid chamber 178 and the auxiliary fluid chamber 158.

Vibration in the up-down direction (main vibration) generated by the engine of a vehicle as the vibration source is known to be a shake vibration with a relatively low frequency (8 to 15 Hz, for example), however, if this shake vibration is categorized in more detail then, generally, it may be categorized into an engine bounce vibration (referred to below simply as "bounce vibration") with a frequency of less than 10 Hz, and a pitching vibration having a frequency of 10 to 15 Hz. In the vibration isolator 148 according to the present exemplary embodiment, the passage length and cross-section of the second orifice 166 that communicates the second pressure receiving fluid chamber 178 and the auxiliary fluid chamber 158 are set (tuned) so as to correspond to the frequency of the bounce vibration (up to 10 Hz).

Furthermore, in the second partitioning member 150 there are outer peripheral cutout portions 168 and 170 formed to the extending portion 154 where it faces, respectively, the communication opening 106 and the communication opening 1110 of the first partitioning member 84, and the other ends of the first orifices 140 and 142 are communicated with the auxiliary fluid chamber 158 through the outer peripheral cutout portions 168 and 170, respectively.

In the second partitioning member 150, there is an opening portion 172 formed in a circular shape to a central portion of the orifice forming portion 156, and a support fastening 174 is disposed to the inner peripheral side of the opening portion 172 coaxially, and also a ring shaped rubber membrane 176 is disposed between the inner peripheral face of the opening portion 172 and the outer peripheral face of the support fastening 174. The outer peripheral face of this rubber membrane 176 is bonded to the inner peripheral face of the opening portion 172, and the inner peripheral face thereof is bonded by vulcanization to the outer peripheral face of the support fastening 174. Furthermore, the support fastening 174 is press inserted and fixed between the inner peripheral support fastening 90 at the outer peripheral side of the internal cylinder 74 and the rubber elastic body 88. The rubber membrane 176 thereby forms a portion of a partitioning wall partitioning the second pressure receiving fluid chamber 178 and the auxiliary fluid chamber 158, and elastically deforms such that the internal volume of the second pressure receiving fluid chamber 178 is able to expand and contract according to the fluid pressure change within the second pressure receiving fluid chamber 178.

Explanation will now be given of the operation of the vibration isolator 148 according to the present exemplary embodiment configured as described above.

In the vibration isolator 148 according to the present exemplary embodiment, basically the same operational effects may be obtained as with the vibration isolator 70 according to the second exemplary embodiment. In addition, in the vibration isolator 148 according to the present exemplary embodiment, there is the second pressure receiving fluid chamber 178 provided, at the internal peripheral side of the outer cylinder 72, between the rubber elastic body 88 and the partitioning members 84 and 150. Due to the second orifice 166 mutually communicating the second pressure receiving fluid chamber 178 and the auxiliary fluid chamber 158, when vibration (secondary amplitude) is inputted in the axial direction (secondary amplitude direction) through the internal cylinder 74 or through the outer cylinder 72, since the rubber elastic body 88 elastically deforms in the secondary amplitude direction, and the internal volume of the second pressure receiving fluid chamber 178 is made, therefore fluid reciprocally flows through the second orifice 166 between the second pressure receiving fluid chamber 178 and the auxiliary fluid chamber 158.

When this occurs, since the passage length and the cross-section of the second orifice 166 are set so as to correspond to the frequency of the bounce vibration, therefore when the input main inputted vibration is the bounce vibration, resonance occurs (liquid column resonance) in fluid flowing mutually between the second pressure receiving fluid chamber 178 and the auxiliary fluid chamber 158 through the second orifice 166, in synchronization with the inputted vibration, and bounce vibration inputted in the secondary amplitude direction can be particularly effectively absorbed by this liquid column resonance.

Also, in the vibration isolator 148, in a case in which the frequency of the inputted main vibration is higher than the frequency of bounce vibration and the amplitude thereof is small, for example, in a case in which the inputted vibration is an idling vibration (20 to 30 Hz, for example) with an amplitude of about 0.1 mm to 0.2 mm, in the second orifice 166 which is tuned to correspond to the bounce vibration, a clogged state occurs, and fluid flow in the second orifice 166 becomes difficult. However, by elastic deformation of the rubber membrane 176 according to changes in the fluid pressure within the second pressure receiving fluid chamber 178, a rise in the fluid pressure within the second pressure receiving fluid chamber 178 is suppressed. Therefore, even when a high frequency vibration is inputted in the secondary amplitude direction, a rise in the dynamic spring constant accompanying a rise in fluid pressure within the second pressure receiving fluid chamber 178 can be suppressed, and high frequency vibrations can be effectively absorbed, by elastic deformation of the rubber elastic body 88 and the like.

The invention claimed is:

1. A vibration isolator comprising:
    an outer cylinder member that is formed in a substantially cylindrical shape, and is connected to one of a vibration generating portion or a vibration receiving portion;
    a mounting member that is disposed at an inner peripheral side of the outer cylinder member, and is connected to the other of the vibration generating portion or the vibration receiving portion;
    a rubber elastic body that is disposed between the outer cylinder member and the mounting member, and elastically connects the outer cylinder member and the mounting member;
    a pair of first pressure receiving fluid chambers, each of which is provided between the outer cylinder member and the mounting member, at least a portion of an internal wall of each first pressure receiving fluid chamber being formed of the elastic body, and the first pressure receiving fluid chambers being filled with fluid;
    an auxiliary fluid chamber that is filled with fluid, an internal volume of the auxiliary fluid chamber being able to expand or contract according to changes in fluid pressure, wherein at least a portion of an internal wall of the auxiliary fluid chamber is formed by a diaphragm; and
    a pair of first restrict passages that communicate respectively the pair of first pressure receiving fluid chambers with the auxiliary fluid chamber,
    wherein one of the first pressure receiving fluid chambers is disposed between the outer cylinder member and the mounting member at one end side in a radial direction with the mounting member being at the center, and the other of the first pressure receiving fluid chambers is disposed between the outer cylinder member and the mounting member at the other end side in the radial direction,
    when the rubber elastic body elastically deforms due to vibration being inputted in a main amplitude direction, along which direction the pair of pressure receiving fluid chambers and the mounting member are arranged, in the radial direction, the rubber elastic body changes internal volumes of the pair of first pressure receiving fluid chambers in directions that are mutually opposite to each other, accompanying with elastically deforming in the main amplitude direction, and
    wherein the diaphragm is formed of a thin membrane such that the diaphragm is thinner than the rubber elastic body,
    the vibration isolator further comprising a second pressure receiving fluid chamber that is at the inner peripheral side of the outer cylinder member, and is provided between the rubber elastic body and a dividing member that is disposed at an axial direction outside of the rubber elastic body, the second pressure receiving fluid chamber being filled with fluid; and
    a second restrict passage that mutually communicates the second pressure receiving fluid chamber and the auxiliary fluid chamber.

2. The vibration isolator of claim 1, wherein the mounting member is disposed so as to pass through the internal peripheral side of the outer cylinder member.

3. The vibration isolator according to claim 2, wherein, at the rubber elastic body, a pair of elastic partitioning wall portions that partition respectively the pair of first pressure receiving fluid chambers from external space are formed, and the cross-sectional shape in the radial direction of each elastic partitioning wall portion is shaped so as to protrude in a convex manner toward chamber inside of the first pressure receiving fluid chamber.

4. The vibration isolator according to claim 1, wherein, at the rubber elastic body, a pair of elastic partitioning wall portions that partition respectively the pair of first pressure receiving fluid chambers from external space are formed, and the cross-sectional shape in the radial direction of each elastic partitioning wall portion is shaped so as to protrude in a convex manner toward chamber inside of the first pressure receiving fluid chamber.

5. The vibration isolator according to claim 1, wherein, at the rubber elastic body, a pair of elastic partitioning wall portions that partition respectively the pair of first pressure receiving fluid chambers from external space are formed, and the cross-sectional shape in the radial direction of each elastic partitioning wall portion is shaped so as to protrude in a convex manner toward chamber inside of the first pressure receiving fluid chamber.

6. The vibration isolator according to claim 1, wherein the auxiliary fluid chamber is formed at a side of the diaphragm with respect to the dividing member, and the second pressure receiving fluid chamber is formed at a side of the rubber elastic body with respect to the dividing member.

7. The vibration isolator according to claim 6, wherein the dividing member configures the second restrict passage.

8. The vibration isolator according to claim 7, wherein a second rubber elastic body is provided to form a portion of a partitioning wall partitioning the second pressure receiving fluid chamber and the auxiliary fluid chamber.

* * * * *